United States Patent [19]

Kealhofer

[11] Patent Number: 6,078,903
[45] Date of Patent: Jun. 20, 2000

[54] APPARATUS AND METHOD FOR MODELING THE RISK OF LOANS IN A FINANCIAL PORTFOLIO

[75] Inventor: Stephen Kealhofer, Lafayette, Calif.

[73] Assignee: KMV Development LP, San Francisco, Calif.

[21] Appl. No.: 09/022,769

[22] Filed: Feb. 12, 1998

[51] Int. Cl.$^7$ ..................................................... G06F 17/60
[52] U.S. Cl. .............................................. 705/36; 705/38
[58] Field of Search ................................... 705/35, 36, 38

[56] References Cited

PUBLICATIONS

El Jahel, Lina, WIlliam Perraudin, & Peter Sellin, "Value At Risk", Quarterly Review—Sveriges Riksbank, pp. 1–7, 1998.
Gupton, Greg M., "The New Talk of the Town: CreditMetrics, a Credit Value–at–Risk Approach", The Journal of Lending & Credit Risk Management, v. 79, n. 12, p. 44(11), Aug. 1997.
Hentschel, Ludger & Clifford W. Smith, Jr., "Risks in Derivatives Markets: Implications for the Insurance Industry", The Journal of Risk and Insurance, v. 64, pp. 323–345, Jun. 1997.
Falloon, "A Wealth of Stealth", *Risk,* vol. 6, No. 7, Jul. 1993.
"CreditMetrics—Technical Document", J.P. Morgan & Co., Incorporated, Apr. 2, 1997.
"Introduction to CreditMetrics", J.P. Morgan & Co., Incorporated, Apr. 2, 1997.

*Primary Examiner*—Allen R. MacDonald
*Assistant Examiner*—Susanna Meinecke-Díaz
*Attorney, Agent, or Firm*—William S. Galliani; Pennie & Edmonds LLP

[57] ABSTRACT

A method executed by a computer under the control of a program includes the steps of storing financial portfolio data in the computer. The financial portfolio data includes data on a loan representing a liability of a specified entity. A horizon date is selected for the loan. A distribution function is then designated to characterize the probability of different market values for the specified entity at the horizon date. A horizon default point threshold is then adjusted at the horizon date until the area bound by the distribution function, the horizon date, and the horizon default point threshold is equal to a horizon date cumulative default rate for the specified entity. A maturity date is also defined for the loan. A final default point threshold is then determined at the maturity date so that an expected default rate from the horizon date to the maturity date is equal to a maturity date cumulative default rate, less the horizon date cumulative default rate. Once the horizon default point threshold and the maturity default point threshold are defined in this manner, a number of input parameters can be derived for further financial portfolio analyses. The portfolio analyses include loan value correlations between affiliated entities.

17 Claims, 3 Drawing Sheets

APPARATUS AND METHOD FOR MODELING THE RISK OF LOANS IN A FINANCIAL PORTFOLIO

BRIEF DESCRIPTION OF THE INVENTION

This invention relates generally to the processing of financial data. More particularly, this invention relates to a technique for modeling the risk associated with loans in a financial portfolio.

BACKGROUND OF THE INVENTION

Tools are needed for managing the credit risk and return of a large scale financial portfolio. This means measuring the risk and return characteristics of the portfolio as it currently exists, exploring specific opportunities to add or subtract from the portfolio, and looking at the effect of large scale changes in the portfolio to assess new tactical and strategic directions.

Portfolio models relying upon Markowitz equations are known in the art. These prior art equations include a return equation where the return associated with the portfolio, $\mu_p$, is determined by the sum of the initial values $w_i$ (expressed either in absolute or relative terms) times the mean return for the assets $\mu_i$, which can be expressed as:

$$\mu_p = \Sigma w_i * \mu_i \qquad \text{(Equation 1).}$$

The Markowitz equations also include a risk equation where the risk associated with the portfolio ($r^2_p$) is determined as a function of the initial values ($w_i$, $w_j$), expressed either in absolute or relative terms, the standard deviation of asset returns ($r_i$, $r_j$), and the correlation of the random returns of assets i and j ($p_{ij}$), which can be expressed as:

$$r^2_p = \Sigma\Sigma w_i w_j r_i r_j p_{ij} \qquad \text{(Equation 2).}$$

Although Markowitz equations and other portfolio analysis equations (collectively referred to as portfolio analysis expressions) are known in the art, there is still great difficulty in establishing accurate input values for portfolio analysis expressions. Thus, it would be highly desirable to provide improved modeling of the risk and return associated with a financial portfolio by establishing a technique for accurately assigning input values that are processed in accordance with portfolio analysis techniques.

SUMMARY OF THE INVENTION

A method executed by a computer under the control of a program includes the steps of storing financial portfolio data in the computer. The financial portfolio data includes data on a loan representing a liability of a specified entity. A horizon date is selected for the loan. An initial entity value is selected, as well as an expected appreciation rate for the entity value. Together these determine a horizon expected entity value. A distribution function is then designated to characterize the probability of different market values for the specified entity at the horizon date, such that the expected value calculated from the distribution function equals the horizon expected entity value. A horizon default point threshold is then adjusted at the horizon date until the area bound by the distribution function, the horizon date, and the horizon default point threshold is equal to a horizon date cumulative default rate for the specified entity. A maturity date is also defined for the loan. For each possible horizon entity value greater than the horizon default point, the expected appreciation rate is used to assign a maturity expected entity value. A distribution function of the same form as used at the horizon is assigned for each maturity expected entity value, so that the expected value from the distribution function matches the maturity expected entity value. A maturity default point threshold is then set. For each possible horizon asset value above the horizon default point this implies a default probability from the horizon to the maturity date. Weighting each one of these default probabilities by the probability of the associated horizon entity value and summing determines an expected default rate from the horizon to the maturity. The maturity default point threshold is then adjusted until the expected default rate is equal to input maturity cumulative default rate minus the input horizon cumulative default rate. (In practice, since there is a continuum of horizon entity values, this process is accomplished via integration of the default rates times the derivative of the distribution function for the horizon entity values.)

Once the horizon default point threshold and the maturity default point threshold are defined in this manner, a number of input parameters can be derived for further financial portfolio analyses. The invention allows one to characterize the return and risk of a debt/loan portfolio, determine optimal buy/sell/hold transactions for a given set of trading or origination opportunities, and to calculate hypothetical optimal portfolios based upon re-arranging the total set of existing holdings.

Loan value correlations are one type of computation that may be executed in accordance with the invention. The techniques of the invention are used to calculate loan value correlations, given a specification of the correlation between the market values of the entities issuing the loans, and given a specification of their default rates. For unaffiliated entities, these values can be obtained by known techniques. When the entities have a common ownership structure (referred to herein as "affiliates"), an embodiment of the invention permits the calculation of loan value correlations. This embodiment of the invention includes classifying affiliated entities into types, and assigning entity correlations and default rates based upon the type of relationship.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
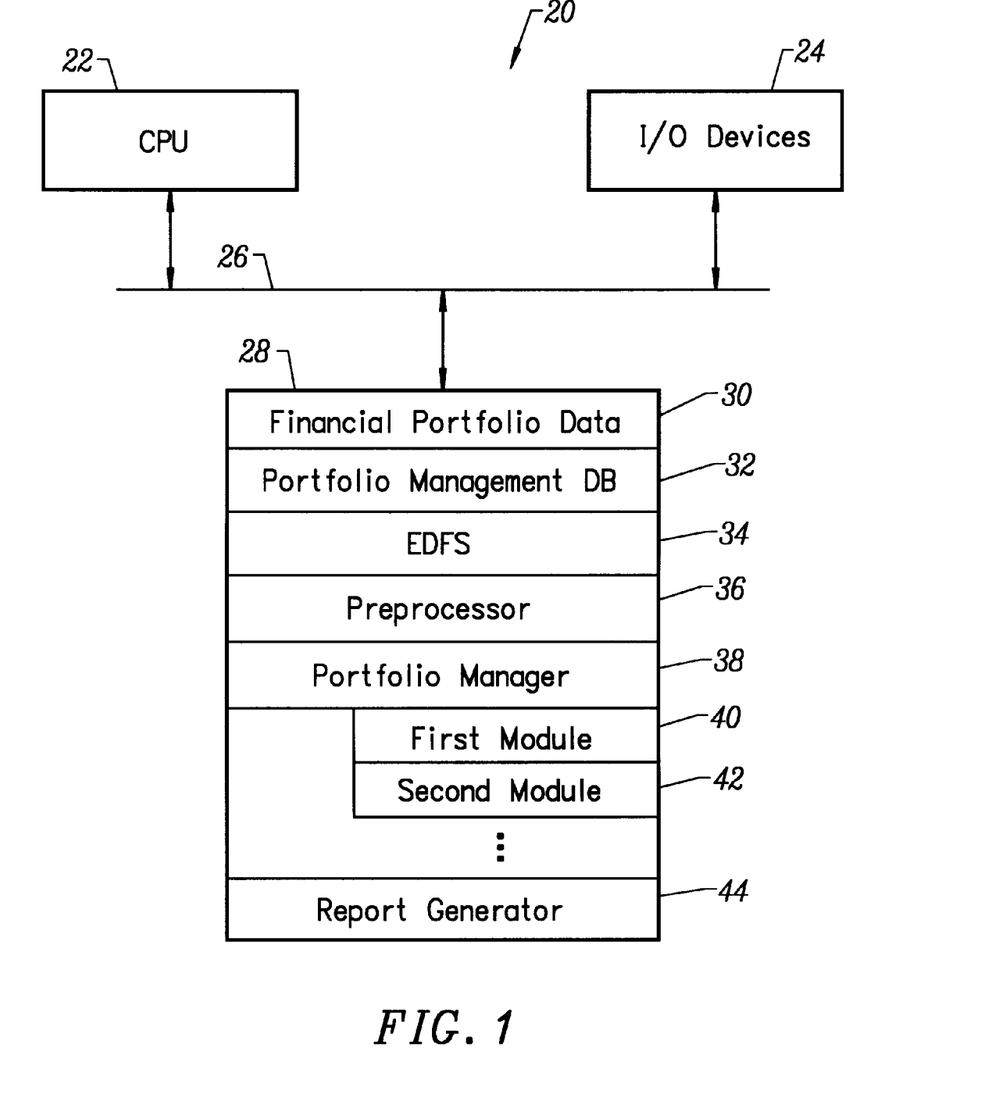
FIG. 1 illustrates a general purpose computer configured to execute the method of the invention.

FIG. 1 illustrates a general purpose computer 20 constructed to implement the present invention. The computer 20 includes a central processing unit (CPU) 22, which communicates with a set of input/output (I/O) devices 24 over a bus 26. The I/O devices 24 may include a keyboard, mouse, video monitor, printer, etc. The CPU 22 also communicates with a memory 28 over the bus 26. The interaction between a CPU 22, I/O devices 24, a bus 26, and a memory 28 are well known in the art; the present invention is directed toward the operation of these elements with respect to a set of data and programs stored in memory 28.

Memory 28 includes financial portfolio data 30, which includes data on loans, as discussed below. As used herein, the term "loan" refers to any liability associated with an entity. Therefore, the loan may be in the form of traditional debt obligations, such as a bond or loan, or other corporate liability with pre-specified payment terms, including, for instance, derivative contracts. This definition excludes common equities.

The memory 28 also includes a portfolio management database 32, which may be of the type known in the art. The memory 28 also includes a set of data referred to as EDFs, or Expected Default Frequencies 34, which are discussed below.

The memory 28 also stores a preprocessor 36, which is used to format information from the EDFs 34, portfolio management database 32, and financial portfolio data 30. Other operations performed by the preprocessor 36 are discussed below.

The memory 28 also stores a portfolio manager 38, which executes the operations associated with the invention. The portfolio manager 38 includes a number of modules 40, 42 which implement discrete steps associated with the processing of the invention. Conventional programming techniques are used to implement these steps. The primary function of the portfolio manager 38 is to establish two default points for an issuing entity. The first default point is set at an arbitrary horizon date. The second default point is set at the maturity date of the loan. Once the horizon default point threshold and the final default point threshold are defined in accordance with the invention, the portfolio manager 38 can be used to derive a number of input parameters that are used for further financial portfolio analyses, such as correlation calculations between affiliated entities, as discussed below. Thereafter, a report generator 42 is used to generate output for the I/O devices 24.

The foregoing discussion provides a general overview of the elements of the apparatus of the invention. Attention presently turns to a more detailed discussion of selected embodiments of these elements. The financial portfolio data 30 can be divided into three main types. First, the financial portfolio data 30 includes parameters. The parameters are current market variables, namely the default-risk-free term structure of interest rates, exchange rates, and pricing of credit risk by rating grade. This information is primarily used for valuation. A second class of data is borrower data. These are data that identify and characterize the borrower rather than the specific loan. They are the borrower's probabilities of default (Expected Default Frequencies or EDFs); also, the borrower's country, industries, business risk and systemic risk proportion. The latter information is used to determine entity correlations between borrowers, as discussed below. The third class of financial portfolio data is facility data. Facility data characterizes the individual loan. They are the commitment amount, maturity, currency, usage data, fees and spread, loss given default, and the cross currency exposure factor. There is also information required about relationships between borrowers (e.g., subsidiary/parent), as well as internal rating and valuation method choice.

The portfolio management database 32 acts as an interface between the preprocessor 36 and an individual entity's internal data systems. Usually its most important function is the collection and collation of data from the commercial loan system and other systems of record in the case of a bank, or as a repository for portfolio information in the case of a fund or insurance company. In addition, the database 32 prepares the basic input data files to the preprocessor 36. It should be appreciated that the individual programs shown in memory 28 may be distributed and executed by a network of linked computers. The programs are shown as being executed by a single computer for the purpose of simplicity.

The preprocessor 36 combines the financial institution's exposure and return data with EDF and correlation data. It also performs audit and test functions that warn the user of obviously erroneous or inconsistent data. In addition, the preprocessor is used to specify a variety of processing options used in the preparation of the portfolio input data.

The portfolio manager 38 processes the data produced by the preprocessor 36 and produces several files of output. In addition, the portfolio manager 38 and/or report generator 44 provide reports and graphs for reviewing output. These reports and graphs are often supplemented by a set of custom reports and graphs that combine output from the portfolio manager 38 and the portfolio management database 32.

Figure 2:
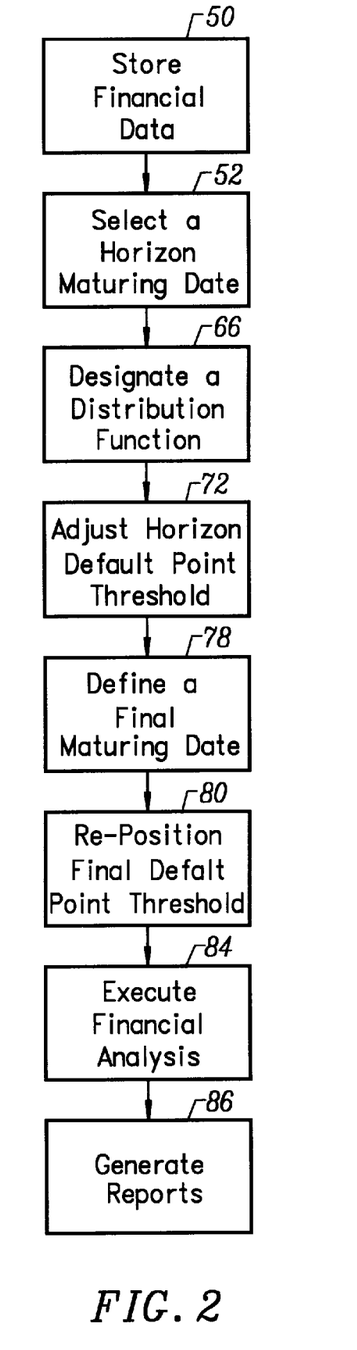
FIG. 2 illustrates processing steps executed by the apparatus of FIG. 1.

FIG. 2 illustrates processing steps associated with the present invention. The first processing step shown in FIG. 2 is to store financial portfolio data (step 50). The nature and content of the financial portfolio data was discussed above and will be further discussed below. The next processing step shown in FIG. 2 is to select a horizon date (step 52). A loan has three associated dates: the origination date ($t_o$), the horizon date ($t_H$), and the maturity date ($t_m$). At the horizon, $t_H$, there are two basic outcomes—no default or default. The probability of default at the horizon is the expected default frequency (EDF). If the borrower has not defaulted and the loan has not matured, then the value of the loan is uncertain because of possible changes in credit quality. This uncertain value is denoted $V_{H|ND}$. If the borrower has defaulted then its value is uncertain because the loss given default, LGD, is uncertain. LGD is the percentage of the loan that is lost in the event of default, or, alternatively, one minus the recovery rate. The loan's uncertain value, given it has defaulted, is denoted as $V_{H|D}$.

The primary source of risk in this model is the possibility of default by the horizon, and the resultant loss in value. The secondary source of risk is credit deterioration by the horizon date that results in a loss of market value but not a default. In general, the horizon value given no default, $V_{H|ND}$, depends upon the credit quality of the borrower at the horizon. The value of the loan will generally not change from the start date if the credit quality of the borrower does not change. However, if the credit quality goes down, the value of the loan at the horizon will go down.

This change in value does not occur if the loan matures at the horizon, since the loan will then be paid back, regardless of the credit quality of the borrower (since we are only focusing now on those outcomes where no default occurs). If the maturity date is only slightly beyond the horizon, then the change in value due to credit deterioration will be small, since the probability of defaulting between the horizon and the maturity date will be small. On the other hand, if the maturity is much longer than the horizon, the same credit deterioration could have a large effect on the value of the loan. To measure this effect, two factors must be considered. The first factor is the range and likelihood of possible credit deterioration (referred to as "credit migration"); the second factor is the effect that credit deterioration has on the value of the specific loan.

The market value of a borrower as a whole, what is referred to as the entity value defines the change in a firm's credit quality through time, or its "credit migration". This value represents the market's view of the present value of expected future cashflows to the total business. These are cashflows prior to any payments to liabilities or capital providers. The nature of a firm's entity value is that it changes through time as the market gets new information about prospective cashflows. This randomness is actually just a reflection of the underlying riskiness of the business. Firms that are less risky do not produce big surprises about future cashflows. More risky firms tend to be ones that are making bets on the success of new technologies, where the payoffs may be years away. In these cases, there are large changes in current value due to new information.

The credit quality of a firm at a specific point in time is the probability that it will be able to pay off its obligations; conversely, its credit risk is its probability of default. The probability of default can be measured by looking at the relationship between the value of the firm today, its liabilities, today, and its volatility. If a firm's entity value is much larger than its liabilities, that means that the market today expects it to have future cashflows greatly in excess of those required to service its obligations. However, just because its market value is high today, does not mean it will continue to be high in the future. The volatility, however, tells one how likely the entity value is to change through time. By considering both the relationship between entity value and liabilities today, and volatility, one can assess the firm's likelihood of default over time.

In practical terms, a firm's credit risk depends on how near the firm is to the point of default. Assume that a firm's entity value is $64 million, that the book value of its liabilities is $16 million, and that its volatility is 15% per year. If one assumes that the firm will default if its entity value falls below the book value of its liabilities, then the firm's default point is an entity value of $16 million. The likelihood of this occurring obviously depends on the time horizon; it is not very likely in a day, more likely in a year, and still more likely in ten years.

One can numerically assess this likelihood by comparing it to the volatility of the firm, 15% per year in this example. A fall in value to $16 million would be a 75% drop in value. Given that a one standard deviation move in entity value is 15% (the definition of volatility), then a 75% drop in a year would be a 5 standard deviation increment event.

In this context, one can define credit migration as a change in the credit quality of the firm occasioned by a change in entity value, book liabilities, or volatility of the firm. In practice, the entity value effect is the most important effect, followed by a change in liabilities. Entity volatilities do not change much through time, and when they do, it is usually due to a spin-off or acquisition that is generally accompanied by a change in liabilities as well.

With the present invention, all of these effects are considered together, because they can be summarized as a change in the number of standard deviations (or standard deviation increments) to the default point. As long as the firm remains the same number of standard deviation increments to the default point, then its credit quality is not changing; if it moves closer then its credit quality goes down, if it moves further away, then its credit quality goes up.

Figure 3:
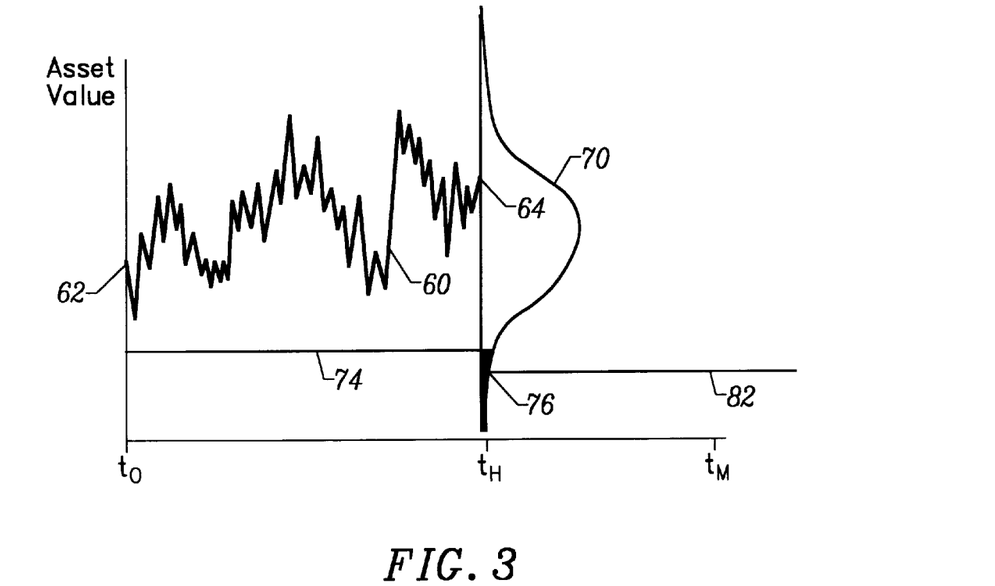
FIG. 3 illustrates a loan modeling configuration constructed in accordance with an embodiment of the invention.

FIG. 3 illustrates credit quality changes due to changes in entity value. The figure shows one possible path 60 for the entity value from time $t_0$ to the horizon $t_H$. The path 60 has a beginning point 62 and a termination point 64 at the horizon. There are many possible paths between the beginning point 62 and termination point 64. There are also many possible initial values and horizon values. One aspect of the invention is to accurately characterize a horizon value, as discussed below.

Returning to FIG. 2, the next processing step shown is to designate a distribution function (step 66). FIG. 3 illustrates a distribution function 70. The distribution function represents the frequency of different entity values at the horizon. The distribution function is selected in the following way. An initial entity value and expected appreciation rate for the entity value are chosen. Together, these determine an expected entity value at the horizon. The distribution function is chosen so that its expected value is equal to the expected entity value at the horizon. If the entity value is approximately unchanged from the current value, then the credit quality will also not change. On the other hand, if the entity value goes up, then the credit quality will improve. If it goes down, the credit quality will fall, and if it goes down far enough, the firm will default. Observe that the path 60 illustrates a number of different entity values between the beginning point 62 and the termination point 64.

Returning to FIG. 2, the next processing step is to adjust a horizon default point threshold (step 72). FIG. 3 illustrates a horizon default point threshold 74. If the entity value falls below this threshold, the asset is in default. In accordance with the invention, this line is adjusted until the area bound by the distribution function 70, the horizon date $t_H$, and the horizon default point threshold 74 is equal to a horizon date cumulative default rate for the loan. This bound area 76 is shown in FIG. 3. The horizon date cumulative default rate for the loan can be considered to be a number between 0 and 1. The area underneath the density function has a value of one. The horizon default point divides this area into two parts, each with a value less than one. By moving the value of the default point, the area under the function below the default point can be made equal to the horizon cumulative default probability.

The horizon date cumulative default rate for the loan is established from expected default frequencies (EDFs). That is, each asset has a corresponding array of default frequencies (EDFs). The array of default frequencies defines a set of discrete times (e.g., first year, second year, etc.) and the probability of default at each time. There are a variety of ways of calculating EDFs. The manner of deriving the EDFs is not critical to the invention, although accurate EDFs are important. The invention is not directed to EDFs per se, rather the invention is directed toward the use of EDFs in establishing a horizon default point threshold in the manner described above. It is the use of the EDFs in this manner that is novel.

Returning to FIG. 2, the next processing step is to define a maturity date (step 78). FIG. 3 illustrates a maturity date $t_m$. A final default point threshold is then adjusted (step 80) at the maturity date until an expected default rate from the horizon date to the maturity date is equal to a maturity date cumulative default rate, less the horizon date cumulative default rate. Thus, as in the case of the horizon default point threshold, EDFs are used to establish the maturity date cumulative default rate.

The maturity default point threshold is set as follows. For each possible horizon entity value greater than the horizon default point, the expected entity appreciation rate is used to assign a maturity expected value. A distribution function of the same form as used at the horizon is assigned for each maturity expected entity value, so that the expected value from the distribution function matches the maturity expected entity value. A maturity default point threshold is then set. For each possible horizon asset value above the horizon default point, this implies a default probability from the horizon to the maturity date. Weighting each one of these default probabilities by the probability of the associated horizon entity value and summing determines an expected default rate from the horizon to the maturity. The maturity default point threshold is then adjusted until the expected default rate is equal to the input maturity cumulative default rate minus the input horizon cumulative default rate.

FIG. 3 illustrates a maturity default point threshold 82. This threshold 82 is adjusted in the manner described above. The setting of this threshold 82 can also be expressed as follows. Assume that the horizon cumulative default rate is designated EH and the maturity date cumulative default rate is designated ET. Given an arbitrary entity value, $A_H$, of the issuer at the horizon, the probability of default from the horizon to maturity is given by $G_M(DP_M|A_H)$, where $DP_M$ is the default point at maturity. $DP_M$ is then chosen such that the integral of $G_M$ from the horizon default point to the upper bound of $A_H$, weighted by the density function dF of the horizon entity value, is equal to ET−EH.

In order to make the calculations that are required for the portfolio equations, it is necessary to specify the range and likelihood of credit qualities at the horizon (the horizon distribution), including the probability of default. The invention described here is a method of constructing this distribution using two pieces of information, namely the cumulative probability of default to the horizon (EH) and the cumulative probability of default to maturity (ET).

In contrast, the approach most often adopted by others is to assume that this distribution can only take on a small number of values, and to specify as part of the input data all of the values and their probabilities. This is the approach used by JP Morgan, New York, N.Y. in their CreditMetrics™ product.

The current approach is an improvement on that method because it requires less data, and the data can be estimated as a unique characteristic of the particular borrower. The CreditMetrics™ approach requires treating all borrowers within a rating grade as being the same, since the estimation of the input data cannot be done for a single firm.

At this point in the processing, the horizon default point threshold and the final default point threshold are established. As shown in FIG. 2, the next processing step is to execute financial analyses (step 84) using this information. These financial analyses can be used to generate reports (step 86). Exemplary financial analyses that may be performed after the horizon default point threshold and the final default point threshold are established as discussed below.

One analysis is to measure the expected loan value and variance of loan value at the horizon. The value of the loan at the horizon H is determined as a function of the issuer business value, $A_H$. This can be expressed as $V_H = g[A_H]$. This function is described below. Thus, the expected value may be expressed as:

$$EV_H = \int g(A_H) dF(A_H) \quad \text{(Equation 3)}.$$

The variance can be expressed as:

$$VarV_H = \int g^2(A_H) dF(A_H) - EV_H^2 \quad \text{(Equation 4)}.$$

Correlation analyses are also performed in accordance with the invention.

Correlation is a measure of the relationship between random variables. In general, the correlation between any two random variables is:

$$\rho_{ij} = \sigma_{ij}/\sigma_i \sigma_j \quad \text{(Equation 5)}$$

where $\sigma_{ij}$ is the covariance between i and j, $\sigma_i$ is the standard deviation of i, and $\sigma_j$ is the standard deviation of j. The denominator is the product of the standard deviations, which scales the covariance $\sigma_{ij}$ to be between −1 and 1. Thus, covariance is the fundamental statistic that measures the degree of interrelationship between two random variables; correlation is simply a re-scaled version of covariance.

In order to measure the covariance or correlation between two random variables, the joint distribution of the random variables must be defined. There is no direct way to measure the joint distribution of the market value of two facilities, due to the inadequate market data and the fact that the most important observations (the ones near default) are rarely observed, and when they are, it is often only shortly before default occurs.

The alternative method which can be employed is simply an extension of how the unexpected loss of an individual loan is determined. A market value distribution for the loan is implied from the distribution of the borrower's underlying entity value. The same thing can be done for two facilities, namely a joint distribution of the market value of two facilities can be derived from the joint distribution of the two borrowers respective underlying entity values.

This has two advantages. First, the entity value distributions of the borrowers are essentially continuous, so there is much more data than in the case of the debt facilities themselves. Second, the entity value distributions are approximately log-normal, so the relationship between them can be adequately characterized by their correlation ("asset correlation"). This is important because it is unlikely to have enough data on individual firms to measure multiple parameters of relationship accurately, even given the observability of the entity value process.

In general, the correlation between the values of the two loans in the portfolio is determined using loan value functions, gi and gj. The loan value function values each cashflow at each date associated with the loan. For purposes of illustration, consider a pure discount loan represented by the obligation to pay a single cashflow of F at time T. Let ET be the cumulative probability of default from the valuation date to the cashflow date T. Then the loan value function g would be:

$$g = F * e^{(-r*T)*(1-q*L)} \quad \text{(Equation 6)}$$

where r is the risk free discount rate, L is the fraction of F that would be lost in the event of a default, and q is the risk neutral probability of default associated with the actual default probability ET. For the case where the entity value has a log-normal distribution, then q and ET are related by the following Black-Scholes option relationship:

$$q = N\{Ninv[ET] + sqrt(T)*(m-r)/s\} \quad \text{(Equation 7)}$$

where N is the cumulative standard normal distribution function, Ninv is its inverse function, m is the expected continuous return to the entity market value, and s is the standard deviation of the log of the entity market value changes. As described above, a default rate can be associated with a given initial entity value. Thus, ET is a function of the entity value, and thus g is a function of the entity value.

The correlation between the values of the two loans in the portfolio is determined by integrating the loan value functions gi and gj, over the full range of entity values for each borrower, weighted by the joint probability density of the entity values. The loan value covariance can be calculated from this result, as well as the correlation.

This process can be illustrated by considering a simple case. Assume that the two loans in question mature at the horizon. Then the loans will either be worth their face value, if no default occurs, or their recovery values, if default occurs. There will be four possible outcomes at the horizon: both in default (JDFij), neither in default (NDij), and one or the other in default (Ci,Cj). Since the loan values are input data for these cases, the calculation only requires determination of the joint event probabilities.

Consider the joint event probabilities. The following equations must be satisfied: JDFij+Ci+Cj+NDij=1, since the total probabilities must sum to one. Also, JDFij+Ci=EHi, the two cases in which loan i defaults must equal the horizon cumulative default probability for loan i; also, JDFij+Cj= Ehj. Since the horizon default probabilities are input values (EHi,EHj), then Ci, D=Cj and NDij can be determined from just one additional piece of information, namely the joint default frequency.

The joint default frequency, JDF, is the likelihood of asset i and j both defaulting during the planning horizon of the portfolio analysis. The JDF is a function of the assets' default points and their asset-level correlation.

JDF is determined similarly to EDF. Recall that the basic credit model posits that when the market value of the entity falls below the default point, the entity will default. One can estimate the market value of the entity today, time $t_o$, but one is actually interested in the value at the end of the horizon, time $T_H$. The entity value of the assets at time $T_H$ is unknown but one can estimate a range for the value using the volatility. The probability that the entity value is below the default point at time $t_H$ is the EDF, $E_H$.

Figure 4:
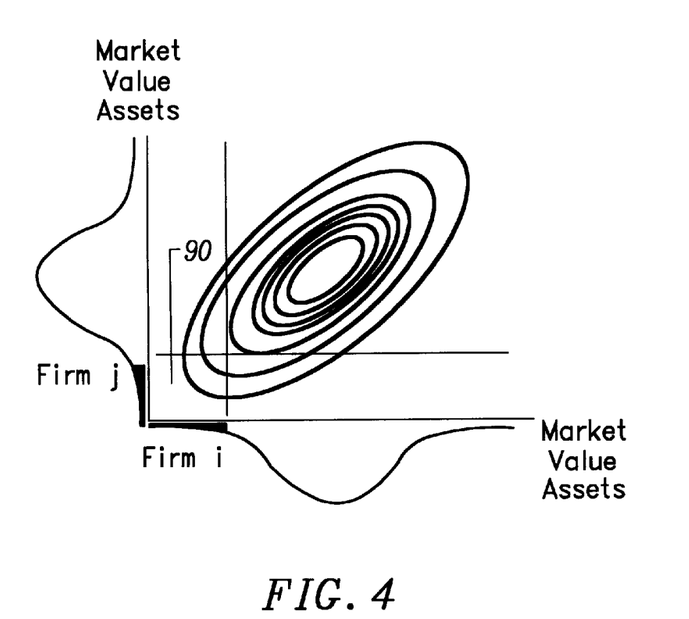
FIG. 4 illustrates correlation modeling between individual financial assets, in accordance with an embodiment of the invention.

The JDF of two firms can be calculated by combining the probability distributions of their entity values to obtain a joint probability distribution. The shape of this distribution will depend on the correlation in the firm's underlying entity values. With zero correlation, the distribution appears as a set of concentric circles and as the correlation increases, positively, the circles appear squeezed, becoming more elliptical with a slope from left to right, as shown in FIG. 4. The JDF is the probability of the entity value falling into the box 90 in the lower left hand corner of the distribution. This area is delineated along the horizontal axis by the $DPT_i$ and by $DPT_j$ along the vertical axis. This probability can be expressed as:

$$JDF=F[DPT_i,DPT_j,\rho_{ij}^A] \qquad \text{(Equation 8)}.$$

where F[*] is the joint cumulative distribution function of the borrower's underlying assets, $DPT_i$ is the default point for firm i, $DPT_j$ is the default point for firm j, and $\rho_{ij}^A$ is the correlation in the firms' underlying entity values, which (in the unaffiliated entity case) is estimated using a factor model. The default points are determined as described above from the horizon cumulative default probabilities. This completes the example for the simple case.

In general, the actual calculation is more complex, because it requires the horizon loan value functions gi and gj, which were described above. For the general case, the joint probability function for the loan values can be deduced from the loan value functions and the joint probability function of the entity values, for all non-default regions.

(The default regions correspond to the simple case just described.) Mathematically:

$$Pr[xo<VHi<=x1,yo<VHj<=y1]=pr[gvi(xo)<AHi<=gvi(x1), gvj(yo)<AHj<=gvj(y1)]$$

where Vhi=gi(AHi), gvi is the inverse of the value function gi, Vhi is the loan value at the horizon, and Ahi is the entity value at the horizon. In the non-default regions, g is a continuous monotone function so this inverse exists. The specification of the entity value distributions depends upon the specification of the default points, and thus depends upon the cumulative default probability values used to construct the default points (This process having been described above). The only additional requirement for determining the joint distribution is the correlation of the entity values, as described above.

Thus, an additional aspect of this invention is a method of ascribing values to the default points and the asset correlation, rhoij, when the two borrowers in question have an affiliated business relationship. An affiliated business relationship exists between a parent and its subsidiary, or between two subsidiaries of the same parent, or where one entity has guaranteed the obligations of the other.

When no affiliation exists, then the calculation is made as described above. When the entities are affiliated but are assumed by the user to be independent, then the calculations are made as described above. When the firm is considered in relationship to itself, then the calculation is made as above, except the asset correlation is assumed to be one. In other cases, the extent of the relationship is not easily determined. For instance, if one entity guarantees another, then the default probability of the guaranteed entity must be no greater than the default probability of the guaranteeing entity. It could however, be much smaller if there were cases when the guaranteeing entity defaulted but the guaranteed entity did not.

One aspect of the invention is to deduce the maximum degree of relationship possible, given the input default frequencies of the two entities, in the following way. Given that the entities are affiliated and not independent or identical, then the entity correlation is set equal to a user set parameter value (usually one or near one). The input default probabilities are determined to reflect the degree of affiliation. These are used to calculate the horizon points as described above, and with the entity correlation, then determine the joint frequency distribution for the entity values of the two related entities.

The input default frequencies are determined prior to the portfolio model calculations in the preprocessor. The relationship of the input default probabilities determines the strength of the affiliation. There are three possible cases. These are described as follows:

A dependent subsidiary is generally the case of a strategic subsidiary, whose success is necessary to the success of the parent, and vice versa. In this case, neither the parent or the subsidiary could default without causing the default of the other, implying that they must have the same default probability.

A semi-dependent subsidiary relationship contemplates a situation in which the borrower is a non-strategic subsidiary of the parent. Thus, a semi-dependent subsidiary can default independently of its parent. However, if the parent defaults, it will take the semi-dependent subsidiary into default with it. The non-strategic subsidiary has at least as much of a default risk as a strategic subsidiary, usually more. Logically, this implies that the $EDF_{subsidiary} > EDF_{parent}$.

A guaranteed entity relationship arises when the supporting entity is a third-party. That is, if the supporting entity defaults, it cannot take the borrower into default. However, the guarantee ensures that the facility cannot be in default unless both the guarantor and the borrower default. Logically, this implies that the $EDF_{borrower} \leq EDF_{support}$. That is, because the guarantor will support the borrower but cannot take it into default, the default probability of the borrower must be less than or equal to the default probability of the guarantor.

Within the process described above, affiliated entity default probabilities are determined in the pre-processor using the following steps. First, default probabilities are assigned to all entities, based upon external data or based upon internal ratings that the user has assigned to the entities.

Second, whether or not the user's internal ratings were used in step one, default probabilities are assigned to the user's internal ratings. There are three default probabilities assigned: minimum, median and maximum. The minimum default probability for one rating is the maximum for the next best rating. The minimum for a rating determined as the geometric average of the median for that rating and the median for the next best rating. Using the minimum and maximum default probabilities, a minimum and maximum ratio of default probabilities from one rating grade to another is determined. These use a mix of the minimum and maximum values depending upon which one yields the minimum or maximum ratio value. Between two adjacent grades, the minimum ratio must be one, by this construction.

Third, the affiliated entity default probabilities are brought into line with the parent/guarantor default probabilities by verifying that the ratio of the default probabilities assigned in step one to both entities are consistent with the minimum and maximum ratio differences given the internal ratings of the two entities. Where the relationships are not satisfied, the default probability of the subsidiary is increased or decreased until the relationship is satisfied.

The effect of this process is to use the information in the user's' internal ratings to determine the strength of the relationship between the affiliated entities' default risks.

Analyses using the Markowitz equations may be executed once the risk and correlation measures are calculated using the framework established in accordance with the invention.

Those skilled in the art will appreciate that the processing steps shown in FIG. 2 can be converted into computer program code modules. For example, a first code module may include instructions to store the financial portfolio data. A second code module may include instructions to select a horizon date, for example by prompting a user through the I/O devices 24 to enter the date. A third module may be used to designate a distribution function, for example by prompting a user through the I/O devices 24 to select a random or optimized distribution function. A fourth module may be used to obtain required data from the first three modules and adjust the horizon threshold in the manner described above. A fifth module can be used to define a maturity date, for example by prompting a user through the I/O devices 24 to enter the date. A sixth module may be used to obtain required data from the other modules and re-position the default point threshold in the manner described above. A seventh module may be used to calculate the standard deviation associated with the distribution function and the number of standard deviation increments between the horizon default threshold and the horizon entity value. An eighth module may be used to perform correlation operations between individual loans in the portfolio. Additional modules may be added to perform additional financial analyses. As will be appreciated by those skilled in the art, these individual modules may be written as combined modules.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A method executed by a computer under the control of a program, said method comprising the steps of:

storing financial portfolio data in said computer, said financial portfolio data including data on a loan representing a liability for a specified entity of a financial portfolio;

selecting a horizon date for said loan;

designating a distribution function to characterize a probability of different market values for said specified entity at said horizon date;

adjusting a horizon default point threshold at said horizon date until an area bound by said distribution function, said horizon date, and said horizon default point threshold is equal to a horizon date cumulative default rate for said specified entity, so as to characterize risk associated with said loan; and generating a report and graph characterizing risk associated with said loan.

2. The method of claim 1 further comprising the steps of:

defining a maturity date for said loan;

designating a second distribution function to characterize a probability of different market values for said entity at said maturity date;

determining a default rate from said horizon date to said maturity date for each market value at said horizon date, given a maturity default point threshold; and determining said maturity default point threshold so that an expected default rate from said horizon date to said maturity date is equal to a maturity date cumulative default rate, less said horizon date cumulative default rate.

3. The method of claim 2 further comprising the step of determining a loan value distribution function from said maturity default point threshold and said distribution function of said horizon date entity values.

4. The method of claim 2 further comprising the steps of:

defining a standard deviation associated with said distribution function;

designating a number of standard deviation increments between said horizon default point threshold and a horizon date entity value associated with said specified entity; and determining the value of said loan from said number of said standard deviation increments.

5. The method of claim 3 further comprising the step of establishing a horizon expected value for said loan and a variance for said loan in reliance upon said loan value distribution function.

6. The method of claim 5 further comprising the step of combining a given initial value for said loan with said horizon expected value for said loan and said variance for said loan to determine values for an expected return and return variance of said loan.

7. The method of claim 1 further comprising the step of correlating said loan of said specified entity with a second loan of a second specified entity of said financial portfolio by determining an entity correlation value, and by determining default rate values appropriate to an entity relationship between said specified entity and said second specified entity.

8. The method of claim 7 further comprising the step of selectively designating said entity relationship as a dependent subsidiary relationship, a semi-dependent subsidiary relationship, and a guaranteed entity relationship.

9. The method of claim 8 wherein said entity correlation value is determined for said entity relationship; and said default rate values are determined for said specified entity and said second specified entity of said entity relationship.

10. A method executed by a computer under the control of a program, said method comprising the steps of:
storing financial portfolio data in said computer, said financial portfolio data including data on a first loan of a first specified entity and a second loan of a second specified entity of a financial portfolio;
correlating said first loan and said second loan by determining an entity correlation value, and by determining default rate values appropriate to an entity relationship between said first specified entity and said second specified entity;
selectively designating said entity relationship as a dependent subsidiary relationship, a semi-dependent subsidiary relationship, and a guaranteed entity relationship, so as to characterize risk associated with said first loan and said second loan; and
generating a report and graph characterizing risk associated with said first loan and said second loan.

11. The method of claim 10 wherein said entity correlation value is determined for said entity relationship.

12. The method of claim 11 further comprising the step of determining a default rate based upon said entity relationship.

13. A computer readable memory that can be used to direct a computer to function in a specified manner, comprising:

a first module storing financial portfolio data including data on a loan representing a liability for a specified entity of a financial portfolio;

a second module to select a horizon date for said loan;

a third mobile to designate a distribution function to characterize a probability of different market values for said specified entity at said horizon date; and a fourth module to adjust a horizon default point threshold at said horizon date until the area bound by said distribution function, said horizon date, and said horizon default point threshold is equal to a horizon date cumulative default rate for said specified entity, so as to characterize risk associated with said loan, said fourth module generating a report and graph characterizing risk associated with said loan.

14. The computer readable memory of claim 13 further comprising:

a fifth module defining a maturity date for an individual financial asset; and a sixth module to designate a second distribution function to characterize a probability of different market values for said entity at said maturity date, to determine a default rate from said horizon date to said maturity date for each market value at said horizon date, given a maturity default point threshold, and to determine said maturity default point threshold so that an expected default rate from said horizon date to said maturity date is equal to a maturity date cumulative default rate, less said horizon date cumulative default rate.

15. The computer readable memory of claim 14 further comprising a seventh module to determine a loan value distribution function from said maturity default point threshold and said distribution function of said specified entity at said horizon date.

16. The computer readable memory of claim 15 further comprising an eighth module to correlate said loan of said specified entity with a second loan of a second specified entity of said financial portfolio by determining an entity correlation value, and by determining default rate values appropriate to an entity relationship between said specified entity and said second specified entity.

17. The computer readable memory of claim 16 wherein said eighth module selectively characterizes the relationship between said specified entity and said second specified entity as a dependent subsidiary relationship, a semi-dependent subsidiary relationship, or a guaranteed entity relationship.

* * * * *